United States Patent
Nishikata et al.

(10) Patent No.: US 11,544,659 B2
(45) Date of Patent: Jan. 3, 2023

(54) TRANSPORT STATUS ESTIMATION SYSTEM

(71) Applicant: TOYOTA JIDOSHA KABUSHIKI KAISHA, Toyota (JP)

(72) Inventors: Yu Nishikata, Musashimurayama (JP); Masao Hitomi, Toyota (JP); Kousuke Matsuyama, Hino (JP); Maiko Eguchi, Hino (JP); Seiji Kuroki, Hino (JP); Hiroaki Kawahara, Hino (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 399 days.

(21) Appl. No.: 16/880,321

(22) Filed: May 21, 2020

(65) Prior Publication Data

US 2020/0380463 A1    Dec. 3, 2020

(30) Foreign Application Priority Data

May 30, 2019    (JP) .............................. JP2019-101012

(51) Int. Cl.
  *G06Q 10/08*    (2012.01)
  *G06T 7/62*    (2017.01)
  *G06T 7/73*    (2017.01)
  *H04N 7/18*    (2006.01)

(52) U.S. Cl.
  CPC .......... G06Q 10/0833 (2013.01); G06T 7/62 (2017.01); G06T 7/73 (2017.01); H04N 7/183 (2013.01)

(58) Field of Classification Search
  CPC ......... G06Q 10/0833; G06T 7/62; G06T 7/73; H04N 7/183
  See application file for complete search history.

(56) References Cited

FOREIGN PATENT DOCUMENTS

| JP | 9-231428 A | 9/1997 |
|---|---|---|
| JP | 3593780 B2 * | 11/2004 |

\* cited by examiner

*Primary Examiner* — Ayanah S George
(74) *Attorney, Agent, or Firm* — Sughrue Mion, PLLC (57) ABSTRACT

A transport status estimation system includes a storage unit configured to store container information in which a container ID and loaded cargo information, an input unit configured to receive input of tracking information, a specifying unit configured to specify which cargo in the loaded cargo information corresponds to the tracking target cargo according to a degree of coincidence between the loading time and the loading location of each cargo included in the loaded cargo information and the loading time and the loading location of the tracking target cargo included in the tracking information, and specify the container ID of the container in which a specified cargo is accommodated based on the container information, and an estimating unit configured to estimate a transport status of the tracking target cargo based on the container ID.

7 Claims, 6 Drawing Sheets

| | 3/21 15:00 | 3/21 17:00 | 3/21 18:00 | | 3/22 11:00 | 3/22 13:00 | 3/22 18:00 |
|---|---|---|---|---|---|---|---|
| A | CHIYODA-KU, TOKYO | YOKOHAMA-CITY, KANAGAWA PREFECTURE | YOKOSUKA-CITY, KANAGAWA PREFECTURE | | KOBE CITY, HYOGO PREFECTURE | IBARAKI CITY, OSAKA PREFECTURE | .... |
| B | .... | .... | .... | | .... | .... | .... |
| C | .... | .... | .... | | .... | .... | .... |
| D | .... | .... | .... | | .... | .... | .... |
| .... | .... | .... | .... | | .... | .... | .... |

TRANSPORT STATUS ESTIMATION SYSTEM

TECHNICAL FIELD

The present disclosure relates to a transport status estimation system for estimating a transport status of cargo.

CROSS-REFERENCE TO RELATED APPLICATION

This application claims the benefit of priority from Japanese Patent Application No. 2019-101012 filed May 30, 2019, the entire contents of which are incorporated herein by reference.

BACKGROUND

Japanese Unexamined Patent Publication No. H9-231428 discloses a transport method in which, when a cargo is loaded on a truck, information on the cargo is transferred to an in-vehicle terminal such that the information on the cargo and the truck transporting the cargo are linked.

Here, for example, when the cargo is transshipped from the truck to a ship and is transported, the information on a container transported by the ship (information on the cargo accommodated in the container) is made unknown, and thus it is likely that a cargo owner does not grasp the transport status. That is, according to the technique of the above-mentioned Patent Document 1, the transport status of the cargo is specified in the situation where the cargo is being delivered by truck. However, for example, for the cargo that has gone through customs and is being transported by sea, it is conceivable that the transport status of the cargo (which container accommodates a company's own cargo, where is the company's cargo being delivered, or the like) is not specified. For example, when an emergency occurs at sea, it is likely that a situation where the traceability of the cargo is not ensured for the cargo owner may last for a long time.

The present disclosure has been made in view of the above circumstances, and an object of the present disclosure is to provide a transport status estimation system in which the traceability of cargo is ensured.

SUMMARY

A transport status estimation system according to an aspect of the present disclosure includes a storage unit configured to store container information in which a container ID allowing a container to be uniquely identified and loaded cargo information including at least information indicating a loading time and a loading location of each cargo accommodated in the container are linked, an input unit configured to receive input of tracking information including at least information indicating a loading time and a loading location of a tracking target cargo, a specifying unit configured to specify which cargo in the loaded cargo information corresponds to the tracking target cargo according to a degree of coincidence between the loading time and the loading location of each cargo included in the loaded cargo information and the loading time and the loading location of the tracking target cargo included in the tracking information, and specify the container ID of the container in which a specified cargo is accommodated based on the container information; and an estimating unit configured to estimate a transport status of the tracking target cargo based on the container ID specified by the specifying unit.

In the transport status estimation system according to one aspect of the present disclosure, the container information in which the container ID and the loaded cargo information are linked is stored, and when the tracking information is input, it is specified which cargo in the loaded cargo information corresponds to the cargo to be tracked according to the degree of coincidence between the loading times and the loading locations, and further, the container ID of the container in which the specified cargo is accommodated is specified based on the container information. As described above, since the container ID and the loaded cargo information are linked, when the tracking information is input, the container ID of the container accommodating the tracking target cargo can be reliably specified. In addition, since the container is the same container through a transport route even when the transportation vehicle is changed (or even when the container is changed, linking before and after the change is possible), it is possible to specify the transport status corresponding to the container ID (such as where it is being delivered), and to appropriately estimate the transport status of the tracking target cargo linked with the container ID from the transport status corresponding to the container ID. As described above, according to the transport status estimation system of the aspect of the present disclosure, it is possible to ensure the traceability of the cargo on any transport route.

The storage unit may be configured to further store a container transport plan in which the container ID and a transport plan of the container indicated by each container ID are linked, and the estimating unit may be configured to specify a transport plan of the container indicated by the container ID specified by the specifying unit based on the container transport plan to estimate the transport status of the tracking target cargo accommodated in the container. As described above, when the transport plan of the container is determined in advance, the transport status of the tracking target cargo linked to the container ID can be estimated with high accuracy based on the transport plan of the container.

The estimating unit may be configured to estimate the transport status of the tracking target cargo based on the loading time and the loading location of a cargo other than the tracking target cargo, the cargo being linked to the container ID specified by the specifying unit. The container ID linked with the tracking target cargo is also linked with the loading time and loading location of another cargo. For this reason, it is possible to estimate the transport location and the like of the container, and to estimate the transport status of the tracking target cargo with high accuracy, for example, based on the loading location of the cargo loaded in the same container at a later time than the tracking target cargo (preferably, the cargo loaded at the loading time close to the current time).

The storage unit may be configured to store the loaded cargo information further including information indicating features of the cargo, the input unit may be configured to receive input of the tracking information further including information indicating features of the tracking target cargo, and the specifying unit may be configured to specify which cargo in the loaded cargo information corresponds to the tracking target cargo in further consideration of a degree of coincidence between the information indicating features of the cargo included in the loaded cargo information and the information indicating features of the tracking target cargo included in the tracking information. By specifying the tracking target cargo considering information (for example, shape, size, and the like) indicating the features of the cargo, it is possible to specify the tracking target cargo with higher accuracy.

The transport status estimation system may further include an imaging unit provided inside the container and configured to capture an image of each cargo accommodated in the container to acquire information indicating features of the cargo, and the storage unit may be configured to store the information indicating features of the cargo acquired by the imaging unit. This makes it possible to easily acquire information indicating the features of the cargo in the loaded cargo information of the container information.

According to the present disclosure, it is possible to provide a transport status estimation system in which the traceability of a cargo is ensured.

DETAILED DESCRIPTION

Hereinafter, embodiments of the present disclosure will be described in detail with reference to the accompanying drawings. In the description of the drawings, the same or equivalent elements will be denoted by the same reference symbols, and repeated descriptions thereof will be omitted.

Figure 1:
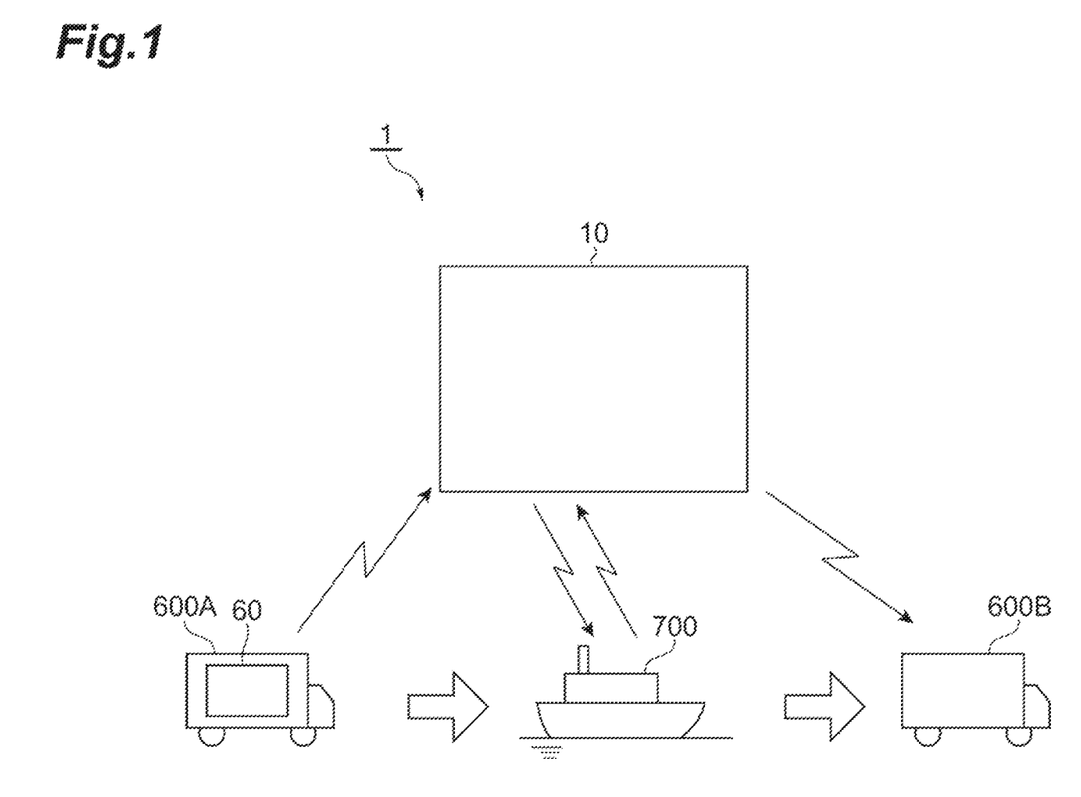
FIG. 1 schematically illustrates an example of a use scene of a transport status estimation system according to an embodiment.

FIG. 1 schematically illustrates an example of a use scene of a transport status estimation system 1 according to an embodiment. The transport status estimation system 1 is a system that estimates a transport status (for example, a transportation location) of a cargo accommodated in a container 60, thereby achieving the traceability of the cargo. The transport status estimation system 1 includes a management device 10. FIG. 1 shows an example in which a container 60 transported by a truck 600A is transshipped on a ship 700, is transported by sea, and then transported to a truck 600B on the ground. In this case, the management device 10 manages the information of the container 60 in a unified manner regardless of the transport route and the transportation vehicle. The management device 10 can communicate with a communication terminal 50 (see FIG. 2) operated, for example, by a cargo's owner requesting the truck 600A to collect his/her cargo, a driver of the trucks 600A or 600B, or a crew of the ship 700, and manages the information on the container 60 in a unified manner by communicating with the communication terminal 50.

Figure 2:
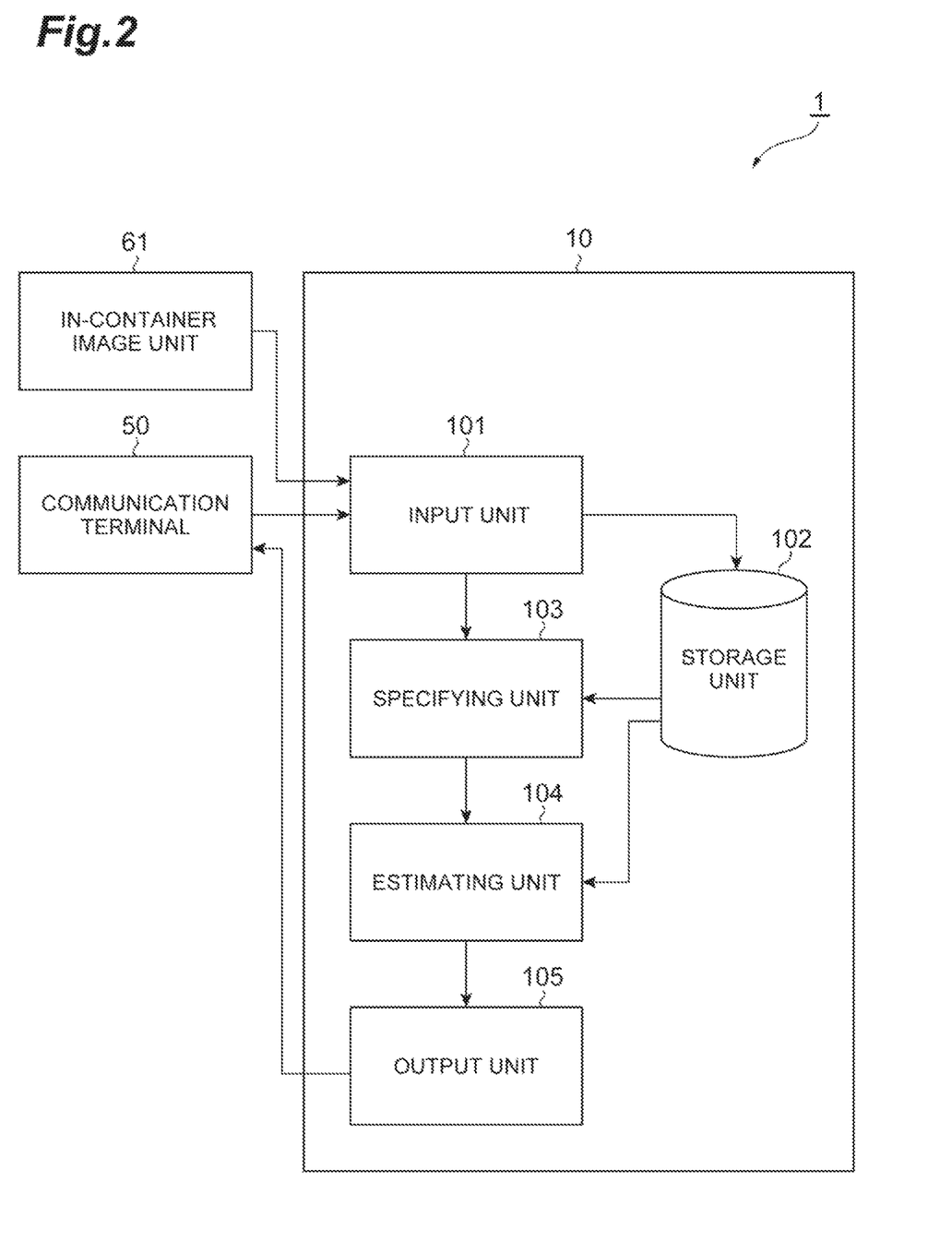
FIG. 2 illustrates functions of a management device included in the transport status estimation system of FIG. 1.

FIG. 2 illustrates functions of the management device 10 included in the transport status estimation system 1 of FIG. 1. As illustrated in FIG. 2, the management device 10 includes an input unit 101, a storage unit 102, a specifying unit 103, an estimating unit 104, and an output unit 105 as functional configurations. The management device 10 is configured to be able to communicate with the communication terminal 50 and an in-container imaging unit 61. Hereinafter, a description will be made assuming that communication terminal 50 is a communication terminal operated by the cargo owner who requests the truck 600A to collect the cargo.

The communication terminal 50 may be any terminal having a communication function, such as a PC, a tablet terminal, or a smartphone. The communication terminal 50 transmits information to the management device 10 according to the operation of the cargo owner, when the cargo owner places the cargo in the container 60 for accommodation (hereinafter, sometimes referred to as "at the time of collecting") and when the cargo owner grasps the transport status of the cargo accommodated in the container 60 (hereinafter, referred to as "at the time of tracking"). Specifically, at the time of collecting, the communication terminal 50 transmits, to the management device 10, information indicating the loading time and loading location of one or a plurality of cargoes that are accommodated in the container 60. The loading time and the loading location may be information input by the cargo owner, or may be information corresponding to the time and position information automatically acquired by the communication terminal 50, for example. Further, the communication terminal 50 transmits information indicating features of one or a plurality cargoes accommodated in the container 60 to the management device 10 at the time of collecting. The information indicating the features of the cargoes, for example, information indicating the shape, size, weight, color, and the like of the cargoes. The information indicating the features of the cargoes may be information input by the cargo owner, or may be, for example, an image of the cargo captured by the communication terminal 50 having an imaging function.

At the time of tracking, the communication terminal 50 transmits, to the management device 10, information indicating the loading time and loading location of the tracking target cargo. The loading time and the loading location may be information input by the cargo owner, or may be information corresponding to the time and position information automatically acquired by the communication terminal 50, for example. At the time of tracking, the communication terminal 50 transmits, to the management device 10, information indicating the features of the tracking target cargo. The information (shape, size, weight, color, and the like) indicating the features of the tracking target cargo may be information input by the cargo owner, or may be, for example, an image of the cargo captured by the communication terminal 50 having an imaging function.

Figure 3:
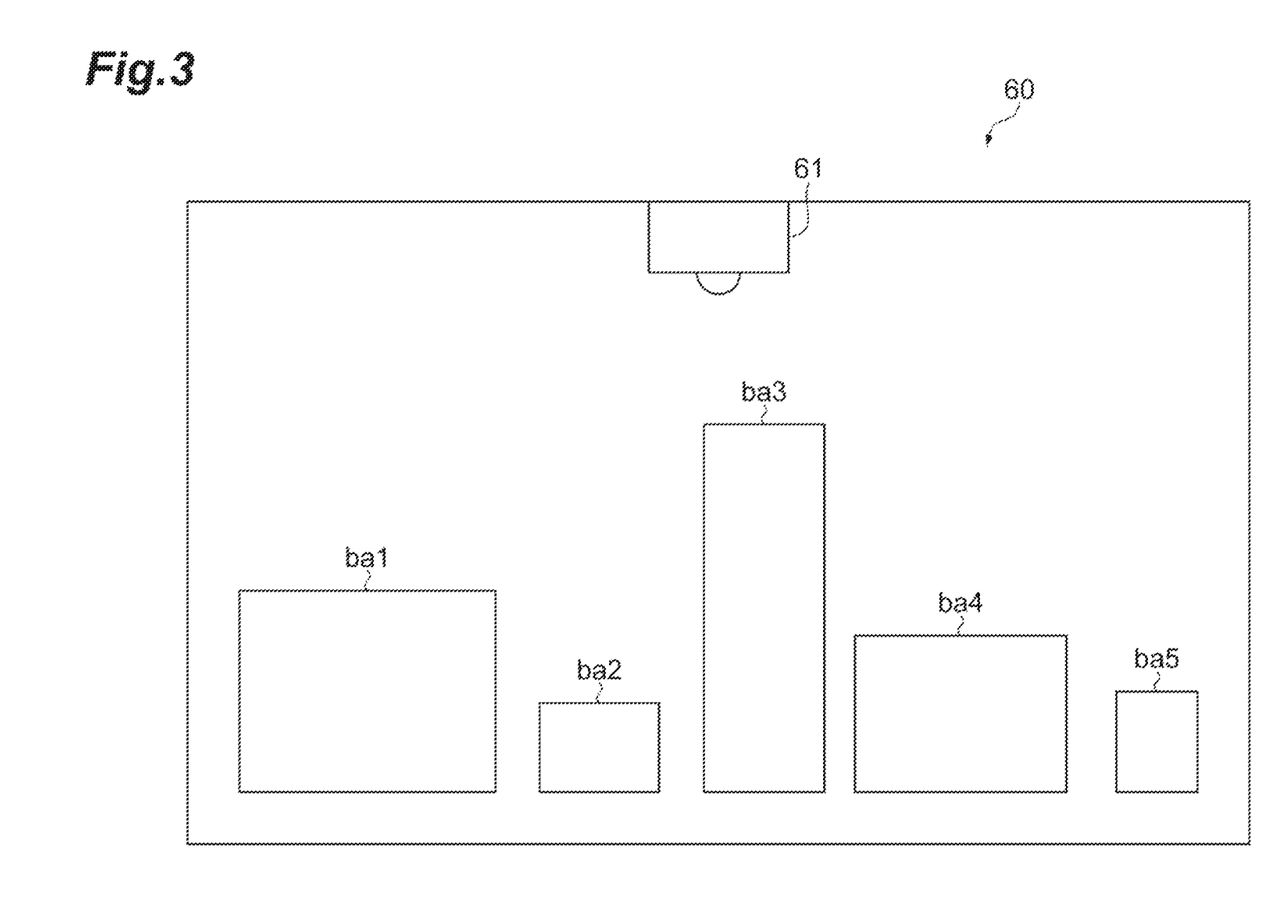
FIG. 3 illustrates a container imaging unit provided inside a container.

The in-container imaging unit 61 is provided inside the container 60, and is a camera (imaging unit) that captures an image of each cargo accommodated in the container 60 to acquire information (shape, size, weight, color, and the like) indicating features of the cargo. For example, at the time of collecting or at the timing after collecting, the in-container imaging unit 61 captures an image of the inside of the container 60, acquires information indicating the features of the cargo by, for example, image recognition, and transmits the information indicating the features of the cargo to the management device 10. FIG. 3 illustrates the in-container imaging unit 61 provided inside the container 60. As shown in FIG. 3, a plurality of cargoes ba1 to ba5 is accommodated inside the container 60. The in-container imaging unit 61 is provided, for example, above the container 60, and is provided to capture an image of the entire area inside the container 60.

Returning to FIG. 2, the input unit 101 receives input of information from the communication terminal 50 and the in-container imaging unit 61. Specifically, at the time of collecting, the input unit 101 receives, from the communication terminal 50, input of information indicating the loading time and loading location of one or a plurality of cargoes that are accommodated in the container 60. In addition, at the time of collecting, the input unit 101 receives, from the communication terminal 50, input of information indicating features of one or a plurality of cargoes accommodated in the container 60. Further, at the time of collecting or at the timing after collecting, the input unit 101 receives, from the in-container imaging unit 61, input of information indicating features of one or a plurality of cargoes accommodated in the container 60. At the time of collecting or at the timing after collecting, the input unit 101 stores information received from the communication terminal 50 or the in-container imaging unit 61 in the storage unit 102. It is to be noted that the input unit 101 does not necessarily need to receive input of all the information described above.

At the time of tracking, the input unit 101 receives, from the communication terminal 50, input of tracking information including information indicating the loading time and the loading location of the tracking target cargo and information indicating features of the tracking target cargo. The input unit 101 outputs the tracking information to the specifying unit 103. It is to be noted that the input unit 101 does not necessarily need to receive input of all the information described above.

The storage unit 102 stores container information in which the container ID allowing the container 60 to be uniquely identified and loaded cargo information including information indicating the loading time and the loading location of each cargo accommodated in the container 60 and information indicating the features of the cargo are linked. Specifically, the storage unit 102 stores the loaded cargo information for each container 60 (for each container ID) based on the information stored by the input unit 101. It is to be noted that the linking of the container ID with the loaded cargo information may be performed based on, for example, information input by the input unit 101 (that is, information provided by the cargo owner operating the communication terminal 50), or may be performed based on the degree of coincidence between the transport plan of the container (which will be described later using FIG. 5) and the loading time and the loading location indicated in the loaded cargo information.

Figure 4:
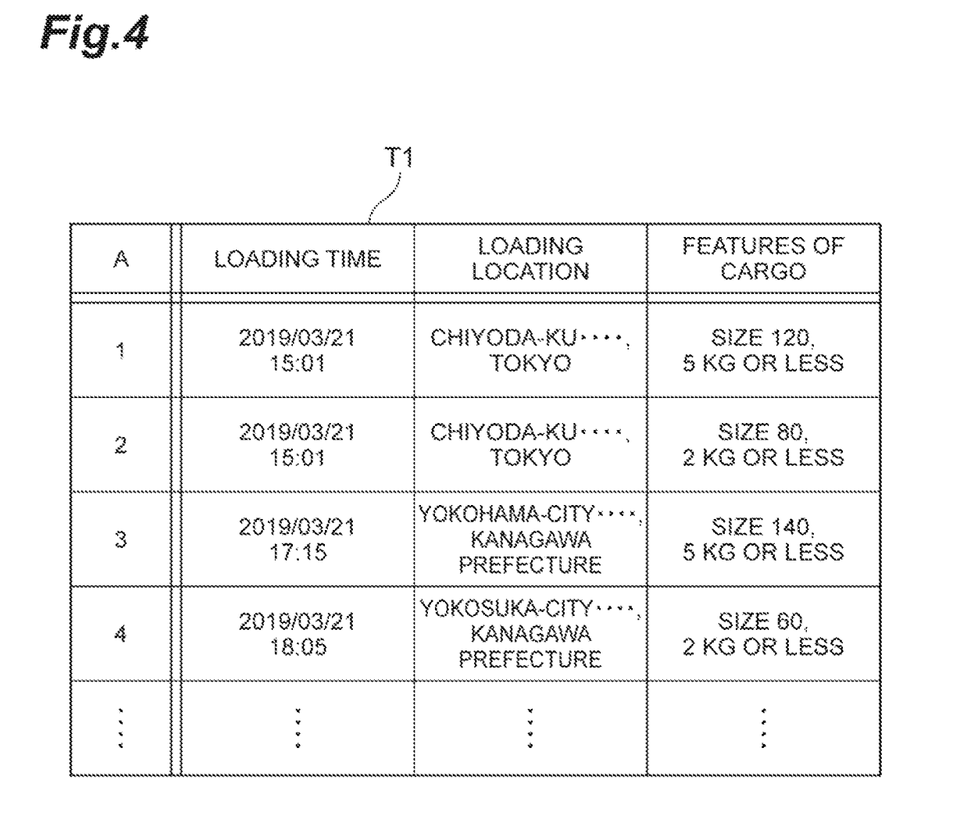
FIG. 4 is a table showing an example of container information stored in a storage unit of the management device.

FIG. 4 is a table showing an example of the container information T1 stored in the storage unit 102. The container information T1 shown in FIG. 4 indicates the loaded cargo information of the container 60 identified by the container ID: A. As shown in FIG. 4, the container 60 identified by the container ID: A accommodates cargo 1, cargo 2, cargo 3, cargo 4, and so on. The information indicating the loading time and the loading location and the features of the cargo is linked to each cargo. For example, for cargo 1, "2019/03/21 at 15: 01" as the loading time, "Chiyoda-ku, Tokyo . . ." as the loading location, and "120 size 5 kg or less" as the features (size and weight) of the cargo are linked.

Figure 5:
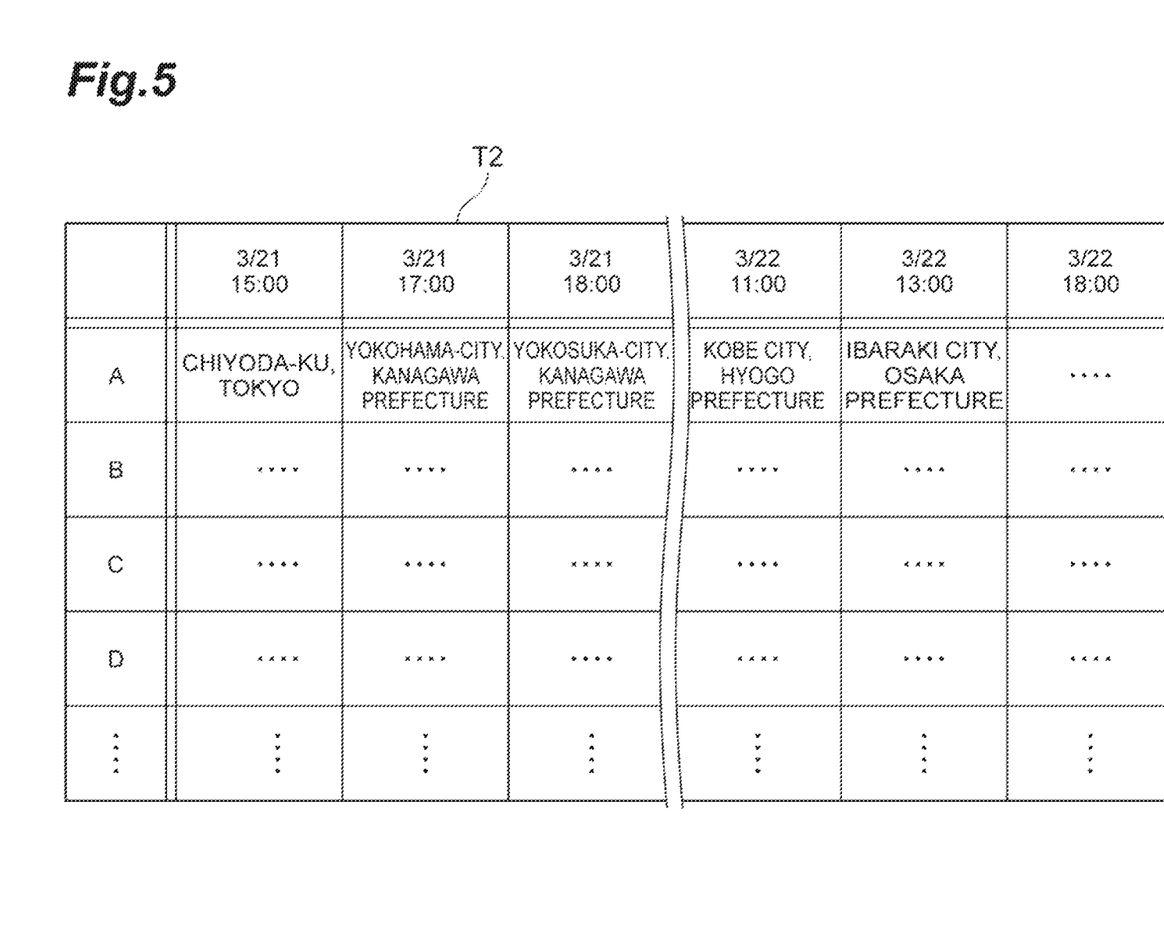
FIG. 5 is a table showing an example of a container transport plan stored in the storage unit of the management device.

The storage unit 102 further stores a container transport plan in which the container ID and the transport plan of the container 60 indicated by each container ID are linked. FIG. 5 is a table showing an example of the container transport plan T2 stored in the storage unit 102. As shown in FIG. 5, in the container transport plan T2, the transport plan of the container 60 is linked to each container ID. For example, it is indicated that the container 60 identified by the container ID: A is planned to be transported to "Chiyoda-ku, Tokyo" at "3/21 15:00", to "Yokohama-City, Kanagawa Prefecture" at "3/21 17: 00", to "Yokosuka City, Kanagawa Prefecture" at "3/21 18: 00", to "Kobe City, Hyogo Prefecture" at "3/22 11:00", and to "Ibaraki City, Osaka Prefecture" at "3/22 13:00".

The specifying unit 103 specifies which cargo in the loaded cargo information corresponds to the tracking target cargo according to the degree of coincidence between the loading time and the loading location of each cargo included in the loaded cargo information to the loading time and the loading location of the tracking target cargo included in the tracking information, and specify the container ID of the container in which a specified cargo is accommodated based on the container information.

That is, when the input of the tracking information is received from the input unit 101, the specifying unit 103 refers to the container information (FIG. 4) of the storage unit 102 to specify the tracking target cargo included in the tracking information. Then, the specifying unit 103 specifies the cargo having a high (relatively high) degree of coincidence between the loading time and the loading location as the tracking target cargo, by determining the loading time and loading location of the tracking target cargo included in the tracking information and the loading time and loading location of each cargo included in the loaded cargo information of the container information. The specifying unit 103 may specify which cargo in the loaded cargo information corresponds to the tracking target cargo, by further considering the degree of coincidence between the information indicating the features of each cargo included in the loaded cargo information and the information indicating the features of the tracking target cargo included in the tracking information. This makes it easy to uniquely specify the tracking target cargo in consideration of the size or the like of the cargo, for example, even when there are cargoes loaded at the same place at the same time. Then, the specifying unit 103 specifies the container ID of the container 60 that accommodates the specified cargo (the tracking target cargo) by referring to the container information (FIG. 4) in the storage unit 102. The specifying unit 103 outputs the specified container ID to the estimating unit 104.

The estimating unit 104 estimates the transport status of the tracking target cargo based on the container ID specified by the specifying unit 103. The transport status is, for example, a location where the cargo is being transported (current position of the cargo).

The estimating unit 104 specifies the transport plan of the container 60 indicated by the container ID specified by the specifying unit 103 based on the container transport plan (FIG. 5) to estimate the transport status of the tracking target cargo accommodated in the container 60. That is, the estimating unit 104 specifies the transport plan of the container 60 with the specified container ID: A by using, for example, the container transport plan T2 illustrated in FIG. 5. Then, for example, when the current time is a time zone close to "3/22 13:00", the estimating unit 104 estimates that the container 60 exists around "Ibaraki City, Osaka Prefecture", and that the tracking target cargo accommodated in the container 60 also exists around "Ibaraki City, Osaka Prefecture".

The estimating unit 104 may be configured to estimate the transport status of the tracking target cargo based on the loading time and the loading location of a cargo other than the tracking target cargo, the cargo being linked to the container ID specified by the specifying unit 103. That is, the estimating unit 104 specifies, for example, the loading time and loading location of the cargo other than the tracking target cargo, which is linked to the container ID: A, by using the container information T1 shown in FIG. 4. Now, it is assumed that the cargo 1 is a tracking target cargo. In this case, the estimating unit 104 specifies the loading times and the loading locations of the cargo 2, the cargo 3, the cargo 4, and so on, other than the cargo 1. Then, for example, when the present time is "3/21 18:30", it is estimated that, based on the loading location of the cargo 4 that has been loaded at "3/21 18:05" which is a time close to the current time, ", "Yokosuka City, Kanagawa Prefecture", the container 60 exists around "Yokosuka City, Kanagawa Prefecture", and the tracking target cargo accommodated in the container 60 also exists around "Yokosuka City, Kanagawa Prefecture". Even when the loading time of another cargo accommodated in the same container 60 and the current time are significantly different (for example, several hours), the estimating unit 104 may estimate where the container 60 is present at the current time (that is, where the tracking target cargo is present), for example, by specifying the change of loading location according to the change of the loading time. The estimating unit 104 may derive the accuracy of the estimation. That is, for example, the estimation accuracy when the transport status is estimated based on the container transport plan (FIG. 5) may be increased, and the estimation accuracy when the transport status is estimated based on the container information (FIG. 4) may be decreased. The estimating unit 104 outputs the estimated transport status of the tracking target cargo to the output unit 105.

The output unit 105 transmits the transport status of the tracking target cargo (that is, the estimation result of the estimating unit 104) to the communication terminal 50. The output unit 105 may transmit the accuracy of the estimation derived by the estimating unit 104 to the communication terminal 50, together with the transport status of the tracking target cargo. This allows the cargo owner to know the degree to which the traceability of the cargo is ensured.

Next, with reference to FIG. 6, a process performed by the management device 10 (specifically, a process at the time of tracking) will be described. FIG. 5 is a flowchart illustrating a process performed by the management device. As an assumption for performing the process of FIG. 6, the storage unit 102 of the management device 10 is to store container information on a plurality of cargoes including the tracking target cargo.

Figure 6:
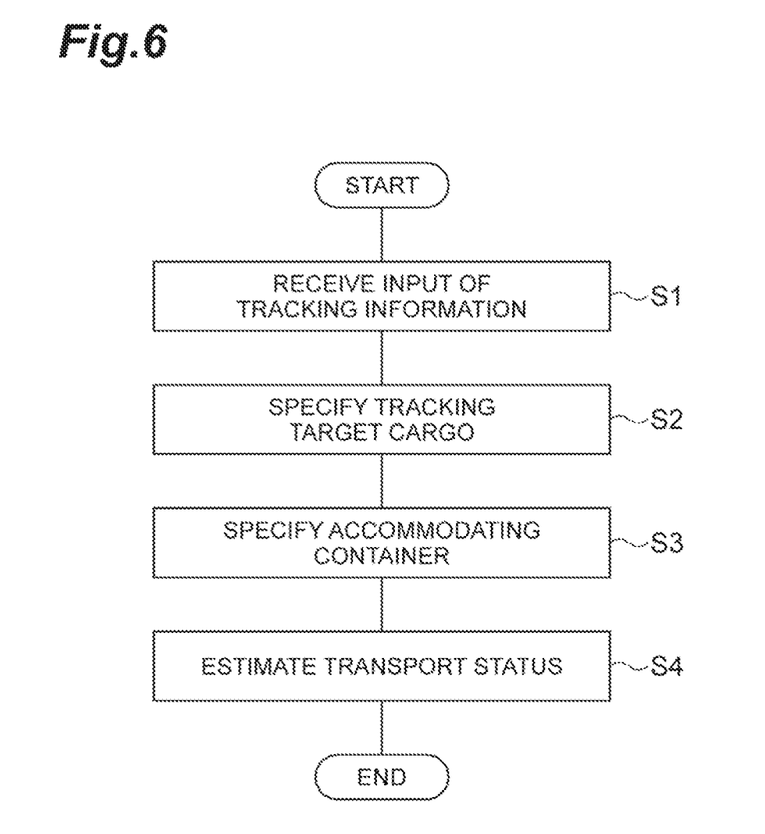
FIG. 6 is a flowchart illustrating a process performed by the management device.

As shown in FIG. 6, first, input of tracking information from communication terminal 50 is received by the input unit 101 (step S1). The tracking information includes, for example, information indicating the loading time and the loading location of the tracking target cargo, and information indicating features of the tracking target cargo.

Subsequently, the tracking target cargo is specified by the specifying unit 103 (step S2). Specifically, the specifying unit 103 specifies which cargo in the loaded cargo information corresponds to the tracking target cargo according to a degree of coincidence between the loading time and the loading location of each cargo included in the loaded cargo information of the container information and the loading time and the loading location of the tracking target cargo included in the tracking information.

Subsequently, by the specifying unit 103, the container 60 in which the specified tracking target cargo is accommodated is specified (step S3). Specifically, the specifying unit 103 specifies the container ID of the container 60 that accommodates the specified cargo (the tracking target cargo) by referring to the container information (FIG. 4) in the storage unit 102.

Finally, by the estimating unit 104, the transport status of the specified container ID is estimated, and the transport status of the tracking target cargo accommodated in the container 60 identified by the container ID is estimated (step S4). Specifically, the estimating unit 104 specifies the transport plan of the container 60 indicated by the container ID specified by the specifying unit 103 based on the container transport plan (FIG. 5) to estimate the transport status of the tracking target cargo accommodated in the container 60. In the above, the process performed by the management device 10 has been described.

Next, the operation and effect of the present embodiment will be described.

The transport status estimation system 1 according to the present embodiment includes the storage unit 102 configured to store container information in which the container ID allowing the container 60 to be uniquely identified and loaded cargo information including at least information indicating the loading time and the loading location of each cargo accommodated in the container 60 are linked, the input unit 101 configured to receive input of tracking information including at least information indicating the loading time and the loading location of the tracking target cargo, the specifying unit 103 configured to specify which cargo in the loaded cargo information corresponds to the tracking target cargo according to the degree of coincidence between the loading time and the loading location of each cargo included in the loaded cargo information to the loading time and the loading location of the tracking target cargo included in the tracking information, and specify the container ID of the container 60 in which a specified cargo is stored based on the container information; and the estimating unit 104 configured to estimate the transport status of the tracking target cargo based on the container ID specified by the specifying unit 103.

In the transport status estimation system 1 according to the present embodiment, the container information in which the container ID and the loaded cargo information are linked is stored, and when the tracking information is input, it is specified which cargo in the loaded cargo information corresponds to the cargo to be tracked according to the degree of coincidence between the loading times and the loading locations, and further, the container ID of the container in which the specified cargo is accommodated is specified based on the container information. As described above, since the container ID and the loaded cargo information are linked, when the tracking information is input, the container ID of the container 60 accommodating the tracking target cargo can be reliably specified. In addition, since the container 60 is the same container through a transport route even when the transportation vehicle is changed (or even when the container is changed, linking before and after the change is possible), it is possible to specify the transport status corresponding to the container ID (such as where it is being delivered), and to appropriately estimate the transport status of the tracking target cargo linked with the container ID from the transport status corresponding to the container ID. As described above, according to the transport status estimation system 1 of the present embodiment, it is possible to ensure the traceability of the cargo on any transport route. In other words, for example, when the cargo is only linked to the truck, it is likely that the cargo owner is not able to grasp the transport status of the cargo when the container is transshipped from the truck to the ship and the cargo that has gone through customs and is being transported by sea. In this regard, in the transport status estimation system 1 according to the present embodiment, the cargo and the container ID are linked, and the transport status is estimated based on the container ID. Therefore, it is possible to secure the traceability of the cargo.

The storage unit 102 may be configured to further store a container transport plan in which the container ID and a transport plan of the container 60 indicated by each container ID are linked, and the estimating unit 104 may be configured to specify a transport plan of the container 60 indicated by the container ID specified by the specifying unit 103 based on the container transport plan to estimate the transport status of the tracking target cargo accommodated in the container 60. As described above, when the transport plan of the container 60 is determined in advance, the transport status of the tracking target cargo linked to the container ID can be estimated with high accuracy based on the transport plan of the container 60.

The estimating unit 104 may be configured to estimate the transport status of the tracking target cargo based on the loading time and the loading location of a cargo other than the tracking target cargo, the cargo being linked to the container ID specified by the specifying unit 103. The container ID linked with the tracking target cargo is also linked with the loading time and loading location of another cargo. For this reason, it is possible to estimate the transport location and the like of the container 60, and to estimate the transport status of the tracking target cargo with high accuracy, for example, based on the loading location of the cargo loaded in the same container at a later time than the tracking target cargo (preferably, the cargo loaded at the loading time close to the current time).

The storage unit 102 may be configured to store the loaded cargo information further including information indicating features of the cargo, the input unit 101 may be configured to receives input of the tracking information further including information indicating features of the tracking target cargo, and the specifying unit 103 may be configured to specify which cargo in the loaded cargo information corresponds to the tracking target cargo in further consideration of a degree of coincidence between the information indicating features of the cargo included in the loaded cargo information and the information indicating features of the tracking target cargo included in the tracking information. By specifying the tracking target cargo considering information (for example, shape, size, and the like) indicating the features of the cargo, it is possible to specify the tracking target cargo with higher accuracy.

The transport status estimation system 1 further includes the imaging unit 61 provided inside the container 60 and configured to capture an image of each cargo accommodated in the container 60 to acquire information indicating features of the cargo, and the storage unit 102 is configured to store the information indicating features of the cargo acquired by the imaging unit 61 inside the container. This makes it possible to easily acquire information indicating the features of the cargo in the loaded cargo information of the container information.

What is claimed is:

1. A transport status estimation system comprising:
    a memory configured to store container information including container ID for uniquely identifying a container and for linking loaded cargo information-, the loaded cargo information including at least information indicating a loading time and a loading location of each cargo accommodated in the container;
    an input interface configured to receive input of tracking information including at least information indicating a loading time and a loading location of a tracking target cargo;
    a controller configured to specify which cargo in the loaded cargo information corresponds to the tracking target cargo according to a degree of coincidence between the loading time and the loading location of each cargo included in the loaded cargo information and the loading time and the loading location of the tracking target cargo included in the tracking information, and specify the container ID of the container in which a specified cargo is accommodated based on the container information; and
    configured to estimate a transport status of the tracking target cargo based on the specified container ID.

2. The transport status estimation system according to claim 1,
    wherein the memory is configured to further store a container transport plan in which the container ID and a transport plan of the container indicated by each container ID are linked, and
    wherein the controller is configured to specify a transport plan of the container indicated by the specified container ID specified by the controller based on the container transport plan to estimate the transport status of the tracking target cargo accommodated in the container.

3. The transport status estimation system according to claim 1,
    wherein the controller is configured to estimate the transport status of the tracking target cargo based on the loading time and the loading location of a cargo other than the tracking target cargo, the cargo being linked to the container ID specified by the controller.

4. The transport status estimation system according to claim 1,
    wherein the memory is configured to store the loaded cargo information further including information indicating features of the cargo,
    wherein the input interface is configured to receive input of the tracking information further including information indicating features of the tracking target cargo, and
    wherein the controller unit is configured to specify which cargo in the loaded cargo information corresponds to the tracking target cargo in further consideration of a degree of coincidence between the information indicating features of the cargo included in the loaded cargo information and the information indicating features of the tracking target cargo included in the tracking information.

5. The transport status estimation system according to claim 4, further comprising:
    an imaging unit provided inside the container and configured to capture an image of each cargo accommodated in the container to acquire information indicating features of the cargo,
    wherein the memory is configured to store the information indicating features of the cargo acquired by the imaging unit.

6. The transport status estimation system according to claim 1, further comprising a communication terminal for receiving the tracking information from one of a truck and a ship, and for transporting the received tracking information to the input interface.

7. The transport status estimation system according to claim 4, wherein the information about features of the tracking target cargo including at least one of the shape, size, weight, and color of the tracking target cargo.

\* \* \* \* \*